(12) United States Patent
Hyde

(10) Patent No.: US 6,450,360 B1
(45) Date of Patent: Sep. 17, 2002

(54) SPRING-LOADED TUBE ASSEMBLY

(75) Inventor: Michael S. Hyde, Norwalk, OH (US)

(73) Assignee: Ergo Solutions, Inc., Monroeville, OH (US)

( * ) Notice: Subject to any disclaimer, the term of this patent is extended or adjusted under 35 U.S.C. 154(b) by 98 days.

(21) Appl. No.: 09/693,869

(22) Filed: Oct. 23, 2000

Related U.S. Application Data

(63) Continuation-in-part of application No. 09/303,676, filed on May 3, 1999, now abandoned.

(51) Int. Cl.$^7$ .............................. B42F 17/14; A47B 9/02
(52) U.S. Cl. ...................... 220/559; 108/136; 211/59.3; 217/64; 312/71; 312/306
(58) Field of Search .............................. 211/59.2, 59.3; 312/71, 306; 108/106, 136; 217/54, 64; 220/559, 629

(56) References Cited

U.S. PATENT DOCUMENTS

| | | |
|---|---|---|
| 608,701 A | 8/1898 | Morse |
| 811,651 A | 2/1906 | Miller |
| 1,632,270 A | 6/1927 | Bradley et al. |
| 2,319,872 A | 5/1943 | Leonard |
| 2,468,115 A | 4/1949 | Saul, Jr. |
| 2,662,802 A | 12/1953 | Gibbs |
| 2,692,177 A | 10/1954 | Larsen |
| 2,717,085 A | 9/1955 | Waddington |
| 2,802,575 A | 8/1957 | Harrison |
| 3,666,114 A | 5/1972 | Davis |

*Primary Examiner*—Lee Young
*Assistant Examiner*—Joseph C. Merek
(74) *Attorney, Agent, or Firm*—Joseph Scafetta, Jr.

(57) ABSTRACT

A plurality of spring tubes is provided in an assembly to make a worker's practice of "pearl diving" unnecessary. A container has one tube attached in each corner and each tube has an internal coil spring secured at a bottom of an inner chamber but extended by a cable looped over a pulley at a top of the tube. A shelf or false bottom is attached to a quick link at an end of the cable in each tube. Each link is guided in a vertical slot formed in an outer chamber of each extruded plastic tube so that the shelf is spring-loaded and weight-responsive. A key advantage of the adjustable shelf is that it prevents back strain and similar muscular injuries to workers who are constantly leaning and bending over to retrieve or store articles in the container. The ability of the shelf to tilt at any or all corners allows it to float and not bind as product is loaded or removed. These tubes and the shelf can be adapted to any of the presently manufactured containers or racks.

7 Claims, 3 Drawing Sheets

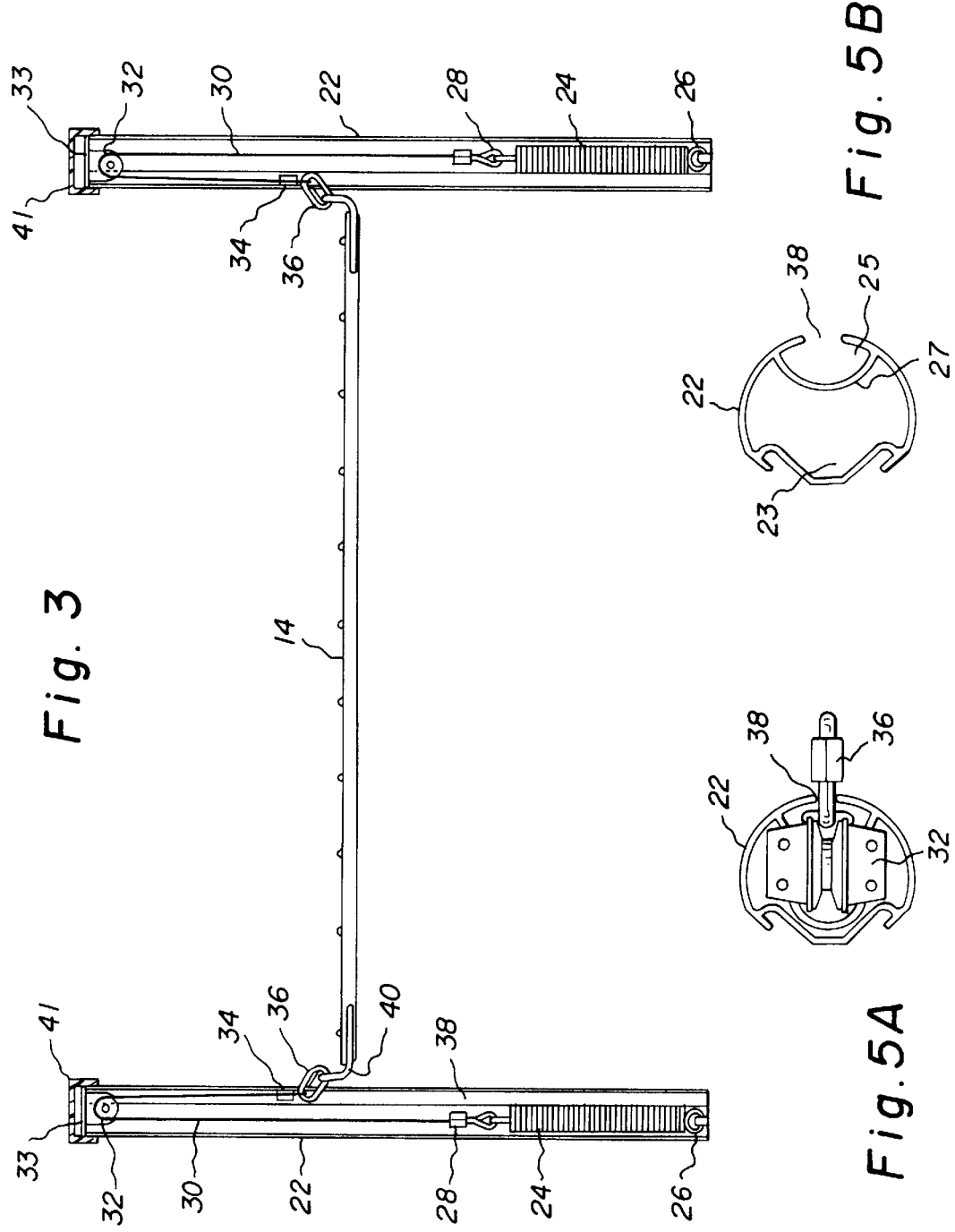

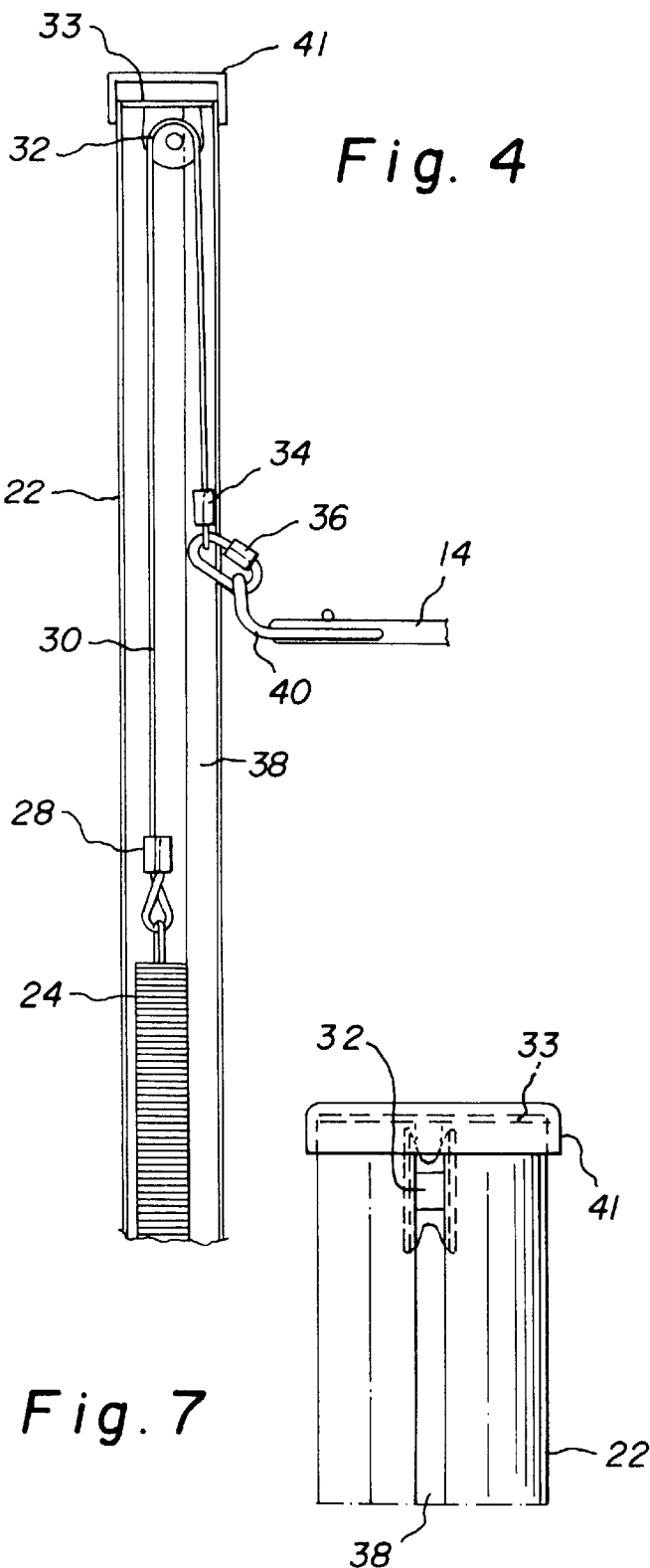

SPRING-LOADED TUBE ASSEMBLY

CROSS-REFERENCE TO RELATED APPLICATION

This application is a continuation-in-part of Ser. No. 09/303,676, filed May 3, 1999, now abandoned.

BACKGROUND OF THE INVENTION

1. Field of the Invention

The present invention relates to an independent spring-loaded tube assembly that can be inserted into any commercially or custom-designed container or rack.

2. Description of the Related Art

In many manufacturing plants, work-in-process, also known as work pieces, are placed into or removed from a lowest part of a container or holding apparatus when an employee "pearl dives", i.e. leans forward and bends down into the container to place or remove a work piece from the bottom.

Depending upon the number of times that an employee repeats this motion by so-called "pearl diving", strain in the back, legs, and arms often results from the amount of leaning and bending. Also, the size of each work-in-process determines the rapidity with which strain will develop. Thus, pearl diving will cause physical trauma and other injuries that frequently lead to lost production time, workman's compensation claims, and occasional litigation.

This problem has been tackled previously. Although various attempts have been made to come up with a viable solution, none of them are known to have met with much success because of their limited applications.

In U.S. Pat. No. 608,701 issued on Aug. 9, 1898, Morse discloses a refrigerator case for shipping perishable articles that are packed onto a false bottom that is raised and lowered in-response to the weight thereon. Dual-acting springs move the bottom up and down.

In U.S. Pat. No. 811,651 issued on Feb. 6, 1906, Miller discloses a box having a spring-loaded bottom which raises and lowers fruit for display. A single spring is coiled around a central tube to move the bottom.

In U.S. Pat. No. 1,623,270 issued on Jun. 14, 1927, Bradley et al. disclose a hamper for holding miscellaneous articles. The hamper has a spring-loaded bottom that is movable to such a height so as to make the articles readily accessible to an operator. The bottom may be elevated or depressed at the will of the operator without much physical effort.

In U.S. Pat. No. 2,319,872 issued on May 25, 1943, Leonard discloses a box having a spring-loaded tray which raises and lowers empty bottles. The spring is hooked for attachment over the top edge of the bin. The opposite end of the spring is riveted. However, no explanation is given as to how the bottom of the angle brace is attached to the container.

In U.S. Pat. No. 2,468,115 issued on Apr. 26, 1949, Saul, Jr., discloses a bin with a movable bottom. The bin was designed with a set of tubes as an integral part of the bin. The springs are also compression-type springs and they are kept at the bottom with a bolt. The slots are only extended part way down the tube, thus causing a portion of the bin to be unusable.

In U.S. Pat. No. 2,662,802 issued on Dec. 15, 1953, Gibbs discloses a self-leveling dispenser for bottles. This dispenser is also a specific container built to have a tray that raises or lowers. The spring is enclosed in a containment device separate from the tray. Gibbs also shows a specific leveler that rides on a plate which keeps the unit from binding.

In U.S. Pat. No. 2,692,177 issued on Oct. 19, 1954, Larsen discloses a design similar to Gibbs but changed in a way so that a leveler rides a bracket. However, Larsen still uses the specific design of Gibbs for the spring mechanism.

In U.S. Pat. No. 2,717,085, issued on Sep. 6, 1955, Waddington discloses a self-leveling dispensing apparatus. This apparatus employs a spring-loaded shelf which uses a leveler to keep the shelf steady. Waddington makes a specific point that his device keeps the shelf from binding.

In U.S. Pat. No. 2,802,575 issued on Aug. 13, 1957, Harrison discloses an elevation adjuster stand. This stand shows one tube inside another tube with springs inside. This arrangement allows the shelf to travel the full length of the tubes. It is assumed that this stand is intended for magazines and newspapers. If it was designed for a specific application, a size change could affect the mechanics.

In U.S. Pat. No. 3,666,114 issued on May 30, 1972, Davis discloses a display rack with a spring-assisted shelf. This self-contained unit was designed for use as a self-leveling device utilizing a support frame to house the springs. The tubes housing the spring incorporate a pulley at the top. A portion of the tray extends into the tube as well.

Although the broad concept of providing a container with a spring-loaded, weight-responsive bottom is disclosed in each of the older U.S. Patents discussed above, unfortunately, none of these early prior art devices are considered satisfactory for a fast-paced assembly line in a modern production plant. Moreover, none of them either disclose or suggest the particular details of the present invention which is a tube assembly attached to a shelf for solving the problem of pearl diving mentioned initially.

Thus, it remains a problem in the prior art to stop the practice of pearl diving in all types of containers or racks so that lost time and compensation claims therefor are eliminated or at least reduced.

SUMMARY OF INVENTION

A primary object of the present invention is to provide a spring-loaded tube assembly which makes the practice of pearl diving unnecessary so that lost production time and workman's compensation claims for back and related leg muscle strain are eliminated. It is also an object to use the tube assembly in any container or rack without the loss of flexibility or space in the container or rack.

This object is accomplished by providing an assembly with a combination of two or more extruded plastic tubes. A spring is housed in an inner chamber and is attached at a bottom of the chamber by a Mechanical fastener. A cable is attached to a top of the spring by a swaged fastener and extends upwardly over a pulley. The cable is then inserted into an outer chamber. One end of this cable has a swaged fastener and ring attached thereto. A quick-link is attached to the ring and extends out through a slot formed in one of the extruded tubes for attachment to a shelf inside a container. Each corner of this shelf has a slide ring assembly which enables the shelf to float independently as weight is applied. This action reduces any distortion that can occur in the shelf when the shelf is not loaded in a uniform manner. Also, the ability of the shelf to tilt at any or all corners prevents it from binding to the sides of the container as work-in-progress is loaded or unloaded. The outer chamber of each tube is adjacent to the shelf while the inner chamber of each tube is spaced farther from the shelf.

A key advantage of this invention is that this unit having four corner spring posts and the shelf can be inserted into any existing commercial or custom-designed container without the need for making additional modifications. The addition of this unit will help prevent back strain and similar muscular injuries to workers who are constantly bending over to retrieve or store articles in the container by placing either the empty shelf or a top of the load on the shelf at a comfortable waist level.

It is another object of the invention to provide an apparatus which is simplistic in its operation. The weight of the work pieces being placed onto or taken from the shelf makes it go down or up, respectively. In other words, the continual addition of items makes the shelf drop and the continual removal of items therefrom makes the shelf rise. The springs maintain the level of work-in-process at an ergonomically acceptable height that is typically set at 30 to 36 inches from the floor.

It is a further object of the invention to ensure that all work-in-progress will be located at or near the acceptable height recommended by optimal ergonomic guidelines either by attaching the shelf to a set of two or more spring-loaded tubes attached to the shelf or by placing them into a container or rack, thus making it a self-contained independent unit which may be portable.

These two embodiments are examples that could be used to accomplish similar results. Instead of only two tubes, three or preferably four or even five tubes may be used. The way that the springs inside the tubes control shelf action, and the possibility that the weight of the product may very greatly, make this invention unique. For example, the springs compensate for different container weights and contents from light, i.e., about 25 pounds, to heavy, i.e., about 1,250 pounds. Furthermore, the rate of speed for raising and lowering the shelf is controlled by spring length and gauge that determine capacity and elongation.

Thus, the ability to work with loads of varying weights, the enclosure of the springs in protective aligning tubes, the simple way of attaching the shelf inside the container, and the ease of changing the springs to accommodate different work needs are primary features of the invention.

These features and other advantages of the invention will become apparent from a review of the attached drawings in conjunction with a careful study of the following detailed description of the preferred embodiments.

BRIEF DESCRIPTION OF THE DRAWINGS

FIG. 3 shows a front elevation view of the present invention with the shelf attached.

FIG. 4 shows a detailed elevation view of one side of the present invention.

FIG. 5A shows a detailed top view of one tube of the present invention.

FIG. 5B shows a detailed bottom view of one tube of the present invention.

FIG. 6 shows a detailed elevation view of the other side of the spring and cable assembly without the tube of the present invention.

FIG. 7 shows a detailed side view of the top of the tube with the pulley and attachments.

DETAILED DESCRIPTION OF THE PREFERRED EMBODIMENT

Figure 1:
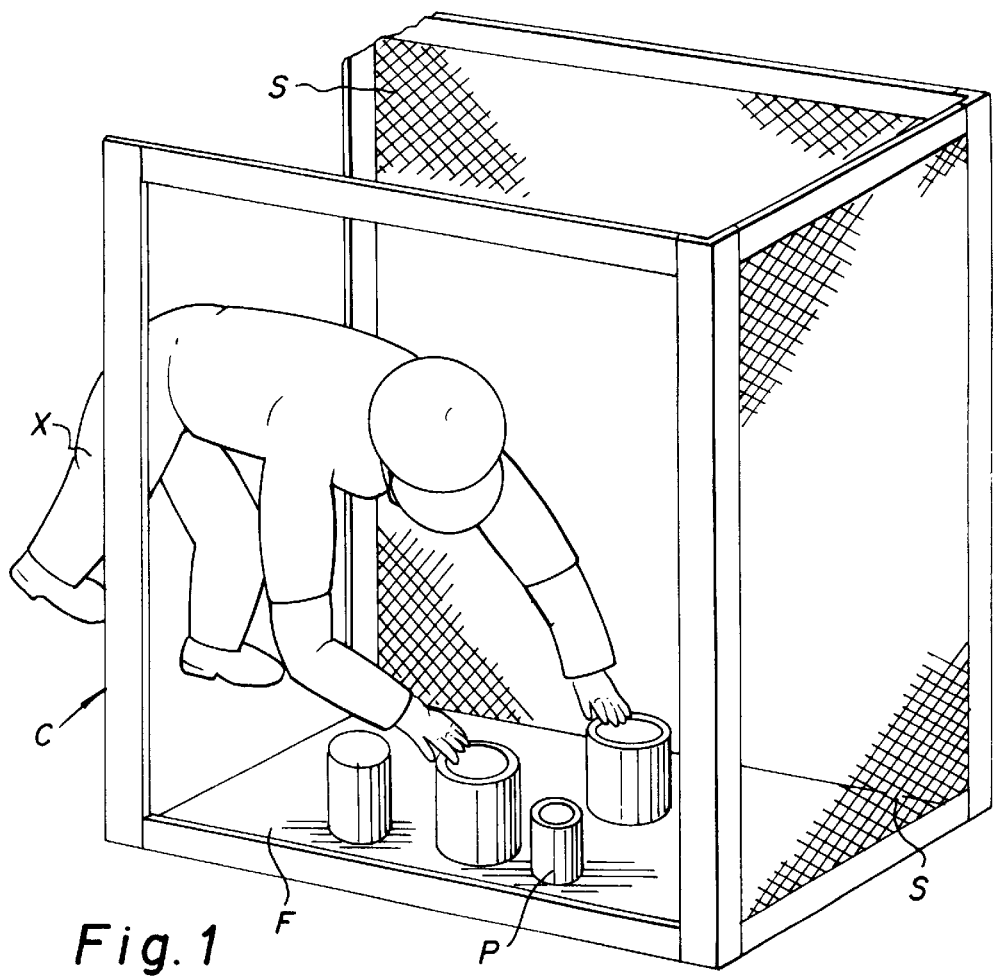
FIG. 1 shows an example of a prior art container into which a worker is pearl diving.

In FIG. 1, a first worker X is shown pearl diving into any container C with three side walls to remove work pieces P which rest on a bottom floor F that is immobile. Such a repetitive leaning and bending motion by the worker X often causes back strain and muscular pain in the legs and arms.

Figure 2:
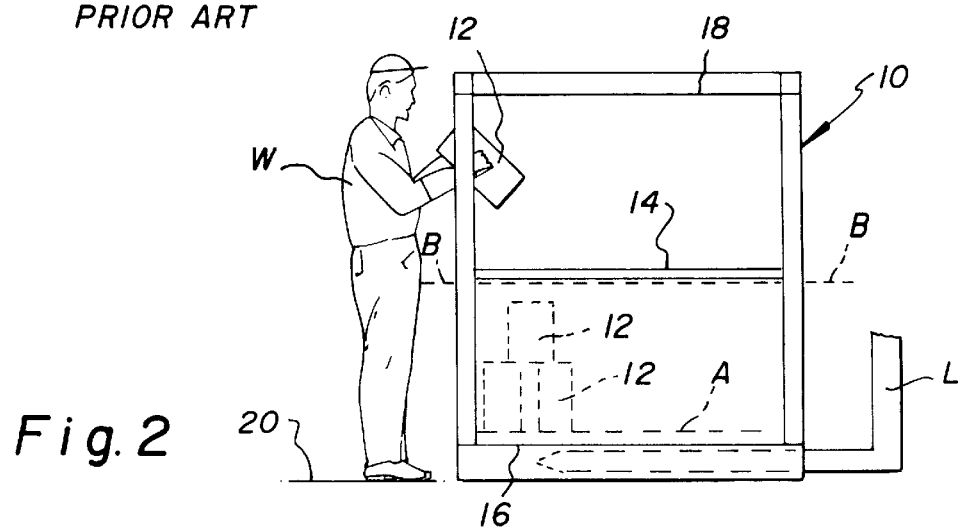
FIG. 2 shows a side elevation view of the present invention inside a container.

In FIG. 2, the present invention, after being inserted into any container, is shown in which a second worker W is standing in front of a container 10 and is ready to place a work piece 12 onto an adjustable shelf 14 which is located at a comfortable waist level when empty. As work pieces 12 are added, the shelf 14 goes down to a minimum depth until it is stopped by a true floor 16 in the container 10. For this reason, the shelf 14 may be called a false bottom which is shown in phantom lines at position A.

Similarly, the second worker W may remove the work pieces 12 until the shelf 14 goes up to a maximum height at the same waist level for the worker W. Thus, the shelf 14 is shown to be returned to its highest point at position B.

For example, the container 10 may measure 48 inches long by 42 inches wide by 60 inches high from the floor 16 to a top 18. The worker W has a height of over six feet and is standing on an outside floor 20. A gate opening (not shown) at the front of the container 10 is measured at 29 inches from the floor 16 and the full net weight of all work pieces 12 is determined to be 300 pounds. Using standard ergonomic guidelines, the shelf 14 should be placed, when empty, at the position B which is approximately 30 inches from the floor 16. When loaded, the shelf 14 will drop the distance from the position B to the position A on the floor 16 inside the container 10. However, the work pieces 12 will have been piled up, as shown in phantom lines, by the worker W so that he shall continue to load them into the container 10 at about the same comfortable waist level of approximately 30 inches at the position B. Thus, the drop from position B to the position A is 22 inches, i.e., 29 inches minus seven inches left below the floor 16 for openings into which forks of a lifter L may enter before moving the container 10. Therefore, there are 52 inches, i.e., 60 inches less seven inches less one inch of actual usable height in the container 10 from the shelf 14 at the position A to the top 18 for the stacking of the work pieces 12.

The shelf 14 will lower 22 inches from the position B to the position A and will carry one-half, i.e., 150 pounds, of the weight of the work pieces 12. This weight means that the tensile strength of a spring to be discussed in regard to FIGS. 3 and 4 should be at least 150 pounds. In other words, 150 pounds of weight will be necessary to stretch the spring so that the shelf 14 is lowered to contact the floor 16 of the container 10. The remaining 150 pounds of the total weight of the work pieces 12 will be loaded at or above the minimum suggested ergonomic height requirement of 30 inches. Consequently, the work pieces 12 can be added to or taken from the container 10 and at no time will the worker W be reaching below the recommended guideline of 30 inches during the process of loading and unloading the container 10. Thus, strain on the back and leg muscles of the worker W is eliminated or at least greatly reduced.

In FIG. 3, the apparatus of the present invention for raising and lowering the attached shelf 14 is shown. However, only two of four tubes 22 are illustrated in this side elevation view. Each tube 22 holds a coiled tension spring 24 secured at a bottom thereof by a first anchor pin 26. At the top of each spring 24, there is a cable loop 28 formed from cable 30 and swaged at one end. The cable 30 then loops over top of a pulley 32 which is secured at the top of the tube 22 by a top plate 33 inside a cap 41. The cable 30 extends back down the tube 22 to an end where a quick link 36 is swaged thereto. The quick link 36 is then connected to a slide corner 40 attached to the shelf 14.

In FIG. 4, the tube 22 is shown in greater detail with the spring 24, cable loop 28, the cable 30, the pulley 32, the top plate 33, the cap 41, the ring 34, and the quick link 36 illustrated more clearly. As seen only in FIG. 4, the extruded plastic tube 22 has a vertical slot 38 formed longitudinally therein so that the quick link 36 slides up and down therein while still connected to either an outer edge or the slide corner 40 of the shelf 14. In essence, the slide corner 40 is a point where two outer edges of the shelf 14 come together.

In FIG. 5A, the tube 22 is shown from a top view with the quick link 36 sticking out of the slot 38. The pulley 32 is also shown. In FIG. 5B, the extruded plastic tube 22 is formed into an inner longitudinal chamber 23 where the spring 24 (not shown for sake of simplicity) is located and an outer longitudinal chamber 25 where the ring 34 is located (but not shown) and the quick link 36 (also not shown) slides in the slot 38 of the outer chamber 25. The tube 22 is divided into the inner chamber 23 and the outer chamber 25 in order to prevent entanglement of the cable 30 with the spring 24. This goal is accomplished because the spring 24 travels only in the inner chamber 23 while the quick link 36, which is attached by the ring 34 to the cable 30, travels only in the slot 38 of the outer chamber 25. The longitudinal chambers 23 and 25 are aligned parallel and adjacent to each other but are separated from each other by a coextensive wall 37 seen only in FIG. 5B.

In FIG. 6, the cable assembly is shown with the front anchor pin 26, the spring 24, the cable loop 28, the cable 30, the ring 34, and the quick link 36 removed from the tube 22 on the right side of FIG. 3.

In FIG. 7, the top of the tube 22 is shown in a side elevation view with the slot 38. The cap 41, the top plate 33, and the pulley 32 are also seen.

Usage of the invention will now be described. The four tubes 22 of FIG. 3 are placed into the four corners of the container 10 in FIG. 2 and are mated thereto. For example, if the container 10 is made of steel, the tubes 22 may likewise be fabricated from the same metal and be tack-welded into the corners thereof. As seen in FIG. 3, the four slide corners 40 of the shelf 14 are hung onto the quick link 36 extending from each tube 22 and the installation of the invention into the container 10 of FIG. 2 is now complete.

Of course, there are alternative ways of constructing the invention. For example, each spring 24 may be secured at the top of each tube 22 instead of at the bottom thereof. Since attachment of the cable 30 is determined by the height of the shelf 14, the length of the cable 30 will be longer or shorter depending on how high the shelf 14 needs to be. Furthermore, since different manufacturers offer various container sizes, the apparatus of the invention may need to be modified in accordance with these varying specifications. For example, some containers are three-sided and triangular in cross-section. Additionally, the springs 24 could be attached through the tubes 22 but underneath the container 10 so that cables 30 of longer lengths would be required.

The above-described embodiment is not intended to be the only manner in which the invention is made. Instead, the scope and the spirit of the invention are defined by the appended claims.

I claim as My invention:

1. A spring-loaded tube assembly for attachment inside a container, said assembly comprising:

a plurality of tubes for placement in the container, each of said tubes having an inner longitudinal chamber and an outer longitudinal chamber aligned parallel and adjacent to each other but separated from each other by a coextensive wall, wherein the outer chamber in each of the tubes has a longitudinal slot made therein;

a coiled tension spring arranged inside the inner chamber of each tube;

an anchor secured at one end of each tube and configured to hold one end of the coiled tension spring therein; and fasteners connected to an edge of a shelf and configured to hold another end of the coiled tension spring;

whereby the shelf is responsive to any weight placed thereon and goes up and down as each coiled tension spring is respectively extended and contracted inside the inner chamber of each tube.

2. A tube assembly according to claim 1, wherein the anchor is a first pin secured at a bottom of the inner chamber of each tube.

3. A tube assembly according to claim 1, wherein the fastener includes a loop holding the one end of the spring, a cable attached at one end to a ring, and a quick link fastened to another end of the cable.

4. A tube assembly according to claim 3, wherein the quick link slides up and down in the longitudinal slot of the outer chamber in response to weight respectively removed from and placed on the shelf.

5. A tube assembly according to claim 3, further comprising a pulley secured at a top of each tube, said cable looping over the pulley and traveling inside the tube.

6. A tube assembly according to claim 5, further comprising a top plate and a cap configured to secure the pulley at the top of each tube.

7. A tube according to claim 6, wherein the edge of the shelf is a slide corner for attachment to the quick link.

* * * * *